Sept. 7, 1926.

O. ZANCAN 1,598,904

DRIVING MEANS FOR MOTOR VEHICLES

Original Filed Feb. 28, 1923　　2 Sheets-Sheet 1

Inventor
Ottario Zancan,
By his Attorney
Geo. H. Byrne.

Sept. 7, 1926.  
O. ZANCAN  
1,598,904  
DRIVING MEANS FOR MOTOR VEHICLES  
Original Filed Feb. 28, 1923   2 Sheets-Sheet 2
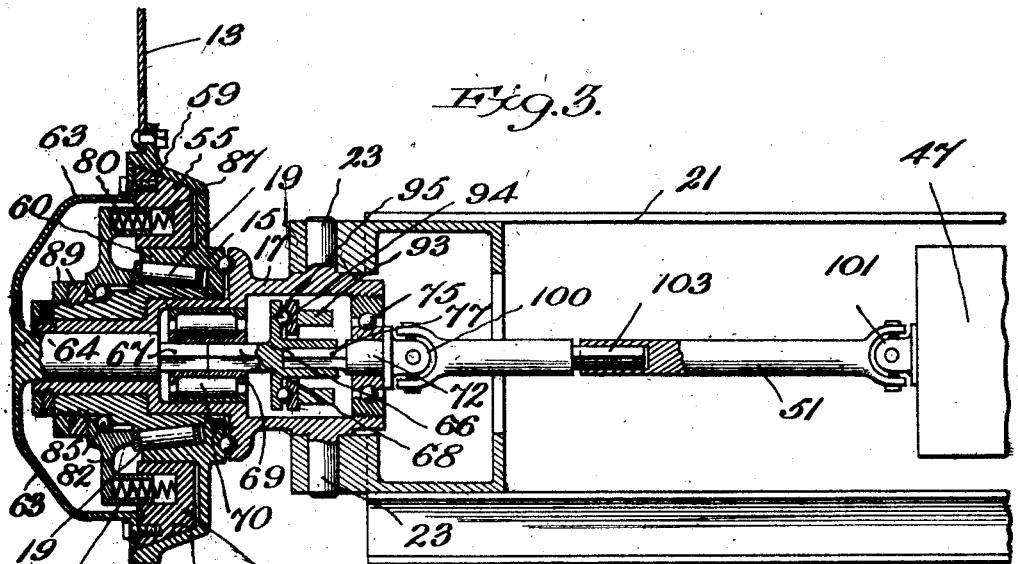
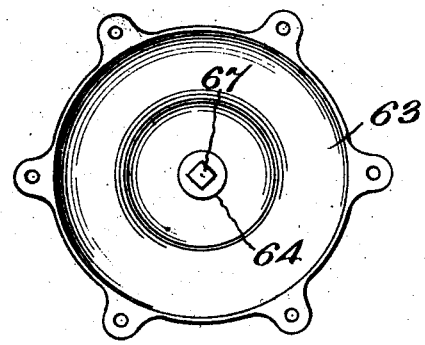
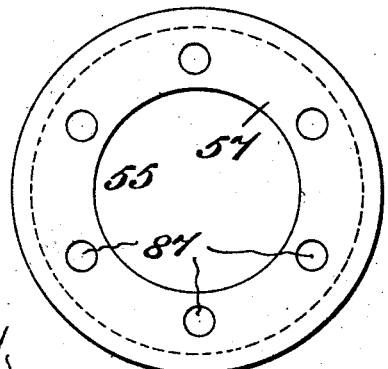
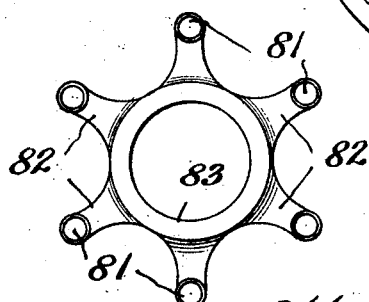
Inventor  
Ottavio Zancan,  
By his Attorney Patented Sept. 7, 1926.

1,598,904

UNITED STATES PATENT OFFICE.

OTTAVIO ZANCAN, OF NEW YORK, N. Y.

DRIVING MEANS FOR MOTOR VEHICLES.

Application filed February 28, 1923, Serial No. 621,941. Renewed January 27, 1926.

This invention relates to driving means for motor vehicles.

The invention provides a driving mechanism in which no differential gearing is required and in which one driving wheel is capable of turning at a different speed from the other when the vehicle turns and when consequently one wheels runs on a longer arc or radius than the other. The invention further provides a driving means in which the clutch is separate from the change speed gearing. The invention further provides a driving mechanism capable of being applied to either a front or a rear wheel drive.

In order to particularly describe and ascertain the nature of my invention and the manner in which it may be carried out, it will now be described in detail with reference to the accompanying drawings, showing one example of said invention.

In said drawings,—

Figure 3 is a sectional view, on an enlarged scale, of the parts shown at the left of Figure 1, and Figures 4, 5 and 6 are detail views of parts of the clutch mechanism.

Figures 1, 2:
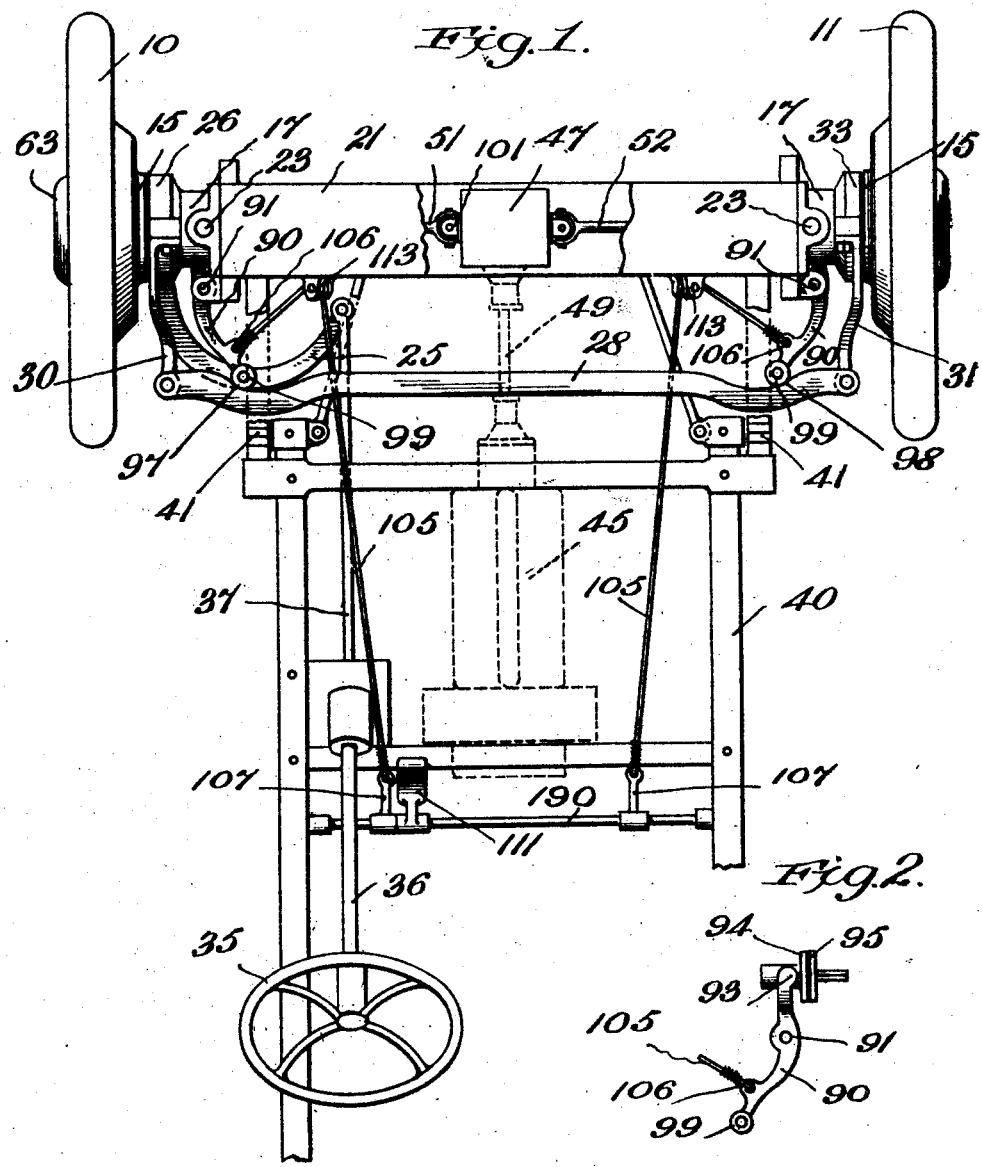
Figure 1 is a top plan view of the front end of an automobile chassis, showing the driving mechanism applied as a front wheel drive.
Figure 2 is a detail view of a clutch lever.

Referring to said drawings, numerals 10 and 11 designates two front wheels of a motor vehicle, which wheels are here shown as of the disk type comprising webs 13 and center portions or hubs 15, turning on hollow axles 17 through roller bearings 19 of the Timken type. The axles 17 are connected to an axle bar or beam 21 by means of knuckle joints 23, and the axles, and consequently the wheels 10, 11 are turned around said knuckle-joints 23, by means of an arm 25 on a collar 26 attached to one of said axles 17, and a connecting bar 28 attached to arms 30, 31 on said collar 26 and a corresponding collar 33 on the opposite axle 17. The steering arm 25 is moved by a steering wheel 35 on a steering post 36, and a drag-link 37 connecting said post and arm 25.

40 designates the chassis-frame, which is connected to the axle bar or beam 21 through springs 41. A motor 45 is mounted on the chassis frame 40, and is connected to a transmission box 47 on the axle bar 21 and containing change speed gearing (not shown) by a universally jointed shaft 49.

The transmission box 47 has lateral shafts 51, 52, for driving each of the wheels 10, 11. These lateral shafts 51, 52 are each connected to the wheels 10, 11 through clutches 55. The clutches 55 conveniently comprise an annular frustro-conical block or drum 57 (Figures 3 and 5) adapted to be moved into and out of frictional engagement with part 59 of the hub 15 having a corresponding friction surface. The drum or annular block 57 is guided on and movable toward and from said part 59 of the hub 15 on a flange 60 on said hub 15. The friction drum or block 59 is connected to a dished disk 63 (Figures 3 and 4) having a central stud 64 projecting into said hollow axle 17 and having a shouldered portion 66 spliced thereto, as by means of squared projections 67, 68 fitting in a square socket in a sleeve 69, and this sleeve may bear in the inside of said hollow axle 17 through roller bearings 70. The adjacent ends 72 of the lateral shafts 51, 52 (see shaft 51 Figure 3) are supported in ball bearings 75 on the inside of said hollow shaft 17 and the ends are connected to the shouldered portion 66 of said stud 64 through a sliding joint 77 permitting axial movement of said part 66 and said stud 64, and thereby causing movement of said disk 63 and the friction drum 55 thereon when said shouldered part 66 is moved. The disk 63 acts as a cover for the outer end of the axle and the bearings and parts thereon.

The friction drum 55 is normally pressed into binding engagement with the friction surface 59 of said hub 15 by springs 80 fitting in sockets 81 in arms 82 on a spider 83 (Figures 3 and 6) turning on said axle 17 through ball-bearings 85 and projecting into sockets 87 in said friction drum so as to turn said spider therewith. Said spider is held in place by lock nuts 89 and acts as a retainer for the Timken roller set.

The stud 64, disk 63 and friction drum 55 carried thereby is moved out of frictional engagement with the surface 59 of said hub 15, against the pressure of the springs 80 by means of levers 90 (Figure 2) pivoted on the axle bar or beam 21 as indicated at 91 and having forked arms 93 adapted to bear on said shouldered part 66 of the stud 64 preferably through a collar 94 and balls 95.

One or the other of the levers 90 are moved by cams 97, 98 on the connecting bar 28 bearing on rollers 99 on the ends of the levers 90 disengage one or other of the clutches 55 as the steering lever 25 is moved to turn the vehicle to one side or the other, as will be more fully explained later.

When the drive is a front wheel drive, as here shown, the shafts 51, 52 each have universal joints 100, 101 therein, and a sliding joint 103 therein, thereby permitting said axles 17, in which are supported the ends 72 of said shafts, to turn.

In order to provide means for disconnecting the engine 45 from the wheels, as when starting or stopping, each of the clutch levers 90 is connected to a cord or rope 105, as indicated at 106, which ropes are connected to rock-arms 107 on a rock-shaft 190 operated by a treadle 111, 113 indicates pulleys over which the ropes 105 are passed.

*Operation.*—Normally both clutch drums 55 associated with each of the wheels 10, 11 are pressed into driving engagement with the hubs 15 of said wheels by the springs 80, so that when the vehicle is traveling along a straight piece of road, both wheels 10, 11 are driven by the engine 45. When however, a turn is reached, and the steering wheel 35 is turned, the steering arm 25 connected to the axle of wheel 10, moves the rod 28 connecting the arms 30, 31 on the axles of the two wheels 10, 11, causing one or the other of the cams 97, 98 to contact with one or the other of the clutch levers 90 and thereby operate one of the clutches 55 to disconnect one or other of the shafts 51, 52 from one or other of the wheels 10, 11. If the turn be to the right, the cam 98 will contact with the clutch lever 90 at the right hand side and disconnect the wheel 11 from its drive-shaft 52, so that said wheel 11 will not be caused to slip when running on an arc of less radius than the other wheel 10. If the turn is to the left, the cam 97 will operate the clutch lever 90 on the left hand side, thereby disconnecting the wheel 10 from its drive shaft 51. The clutch levers 90 press on the shouldered part 66 on the stud 64 projecting within the axles 17 and through the disks 63 move the friction drums 57 out of contact with the friction surfaces 59 of the hubs 15, against the pressure of the springs 80, as heretofore explained.

Both clutches 55 may be operated to disconnect the shafts 51, 52 from both wheels 10, 11, by operation of the front treadle 111, connected by the ropes 105 to the two lever arms 90, as heretofore explained.

The inventive ideas herein set forth may receive other embodiments than that herein specifically illustrated and described.

What I claim and desire to secure by Letters Patent is:—

1. An automobile driving mechanism comprising a pair of wheels, a driven shaft for each wheel, a clutch and springs within each wheel adapted to connect it with its corresponding driven shaft, steering mechanism and means under the control of the steering mechanism for operating one or the other of said clutches to disconnect one or the other of said wheels from its driven shaft, said clutch operating means comprising a rod movable by said steering mechanism, cams on said rod, and levers for operating said clutches adapted to be moved by said cams.

2. An automobile driving mechanism, comprising a pair of wheels, a driven shaft for each wheel, a pivoted axle for each wheel, a clutch and radially disposed springs within each wheel adapted to connect it with its corresponding driven shaft, steering mechanism and means under the control of the steering mechanism for operating one or the other of said clutches to disconnect one or the other of said wheels from its driven shaft, and means for operating both clutches simultaneously to disconnect both wheels from said driving shaft.

3. An automobile driving mechanism comprising a pair of wheels, a driven shaft for each wheel, a pivoted axle for each wheel, a joint in each shaft permitting turning of the wheel connected thereto, a clutch and a plurality of coil springs within the hub of each wheel adapted to connect it with its corresponding driven shaft, steering mechanism, and means under the control of the steering mechanism for operating one or the other of said clutches to disconnect one or the other of said wheels from its driven shaft.

4. An automobile driving mechanism comprising a pair of wheels, a driven shaft for each wheel, a clutch and a plurality of coil springs radially mounted within the hub of each wheel adapted to connect it with its corresponding driven shaft, said clutches each having a driving part and a driven part, an axially movable part connected to said driving part and to a driven shaft, said driven part being connected to said wheel, steering mechanism, means under the control of the steering mechanism for operating one or the other of said axially movable parts to disengage the driving clutch part from the driven clutch part on one wheel or the other, and means for operating both clutches simultaneously to disconnect both wheels from said driving shaft.

5. An automobile driving mechanism comprising a pair of wheels, a driven shaft for each wheel, a clutch and a plurality of coil springs radially mounted within the hub of each wheel adapted to connect it with its corresponding driven shaft, said clutches each having a driving part and a driven part, an axially movable part connected to said driving part and to a driven shaft, said driven part being connected to said wheel, steering mechanism, and means under the control of the steering mechanism for operating one or the other of said axially movable parts to disengage the driving clutch part from the driven clutch part on one wheel or the other, said clutch operating means comprising an operating lever for the axially movable part connected to each driven shaft.

6. An automobile driving mechanism comprising a pair of wheels, a pivoted axle for each wheel, a driven shaft for each wheel, a clutch between each wheel and each shaft, said clutches each having a driving part and a driven part, said shafts having portions extending into said axles and universal joints between said shaft portions carried by the pivoted axles and the driven shafts permitting turning of the former with said axles, an axially movable part connected to the portions of said driven shaft on the pivoted axles and to the driving parts of the clutches, the steering mechanism, and means under the control of the steering mechanism for operating one or the other of said axially movable parts to disengage the driving clutch part from the driven clutch part on one wheel or the other.

7. An automobile driving mechanism comprising a pair of wheels, a pivoted axle for each wheel, a driven shaft for each wheel, a clutch between each wheel and each shaft, said clutches each having a driving part and a driven part, said shafts having portions extending into said axles, and joints between said shaft portions carried by the pivoted axles and the driven shafts permitting turning of the former with said axles, an axially movable part connected to the portions of said driven shafts on the pivoted axles and to the driving parts of the clutches, steering mechanism, and means under the control of the steering mechanism for operating one or the other of said axially movable parts to disengage the driving clutch part from the driven clutch part on one wheel or the other, said axially movable part comprising a stud extending into said axle and a disk on said stud connected to a driving part of a clutch.

8. An automobile driving mechanism comprising a pair of wheels, a pivoted axle for each wheel, a driven shaft for each wheel, a clutch between each wheel and each shaft, said clutches each having a driving part and a driven part, said shafts having portions extending into said axles, and joints between said shaft portions carried by the pivoted axles and the driven shafts permitting turning of the former with said axles, an axially movable part connected to the portions of said driven shafts on the pivoted axles and to the driving parts of the clutches, steering mechanism, and means under the control of the steering mechanism for operating one or the other of said axially movable parts to disengage the driving clutch part from the driven clutch part on one wheel or the other, said steering means and clutch operating means comprising a steering arm on a wheel, a connecting rod connecting the pivoted axles of the two wheels, levers engaging said axially movable parts and means on said connecting rod for operating one or the other of said levers.

In testimony whereof, I have signed my name to this specification this 21st day of February 1923.

OTTAVIO ZANCAN.